United States Patent [19]
Fischer et al.

[11] Patent Number: 6,151,480
[45] Date of Patent: Nov. 21, 2000

[54] SYSTEM AND METHOD FOR DISTRIBUTING RF SIGNALS OVER POWER LINES WITHIN A SUBSTANTIALLY CLOSED ENVIRONMENT

[75] Inventors: Larry G. Fischer, Waseca; David S. Russell, St. Paul, both of Minn.

[73] Assignee: ADC Telecommunications, Inc., Minnetonka, Minn.

[21] Appl. No.: 08/884,533

[22] Filed: Jun. 27, 1997

[51] Int. Cl.[7] .............................. H04H 1/14; H04H 1/00; H04H 7/10

[52] U.S. Cl. ................................. 455/3.3; 348/8; 348/12; 455/5.1

[58] Field of Search ..................... 348/6, 10, 11, 348/7, 12, 13, 8; 455/3.1, 3.3, 4.1, 4.2, 5.1, 6.1, 6.2, 6.3, 14, 20–22, 63, 66, 205, 208, 209, 313–319, 7.1, 11.1

[56] References Cited

U.S. PATENT DOCUMENTS

| | | | |
|---|---|---|---|
| 3,818,481 | 6/1974 | Dorfman et al. | 340/310 |
| 3,876,984 | 4/1975 | Chertok | 340/152 |
| 3,944,723 | 3/1976 | Fong | 178/3 |
| 3,964,048 | 6/1976 | Lusk et al. | 340/310 |
| 4,520,363 | 5/1985 | Wachspress et al. | 343/828 |
| 4,538,136 | 8/1985 | Drabing | 340/310 |
| 4,577,333 | 3/1986 | Lewis et al. | 375/45 |
| 4,638,496 | 1/1987 | Jensen | 375/104 |
| 4,675,691 | 6/1987 | Moore | 343/908 |
| 4,701,763 | 10/1987 | Yamamoto et al. | 343/700 |
| 4,701,764 | 10/1987 | Malcombe | 343/742 |
| 4,907,006 | 3/1990 | Nishikawa et al. | 343/700 |
| 4,994,820 | 2/1991 | Suzuki et al. | 343/846 |
| 5,010,349 | 4/1991 | Mizuno et al. | 343/700 |
| 5,061,938 | 10/1991 | Zahn et al. | 343/700 |
| 5,151,838 | 9/1992 | Dockery | 340/310 |
| 5,270,721 | 12/1993 | Tsukamoto et al. | 343/700 |
| 5,291,210 | 3/1994 | Nakase | 343/700 |
| 5,300,936 | 4/1994 | Izadian | 343/700 |
| 5,319,634 | 6/1994 | Bartholomew et al. | 370/18 |
| 5,327,230 | 7/1994 | Dockery | 348/8 |
| 5,351,272 | 9/1994 | Abraham | 375/38 |
| 5,404,570 | 4/1995 | Charas et al. | 455/22 |
| 5,457,557 | 10/1995 | Zarem et al. | 359/121 |
| 5,475,394 | 12/1995 | Kohls et al. | 343/700 |
| 5,497,142 | 3/1996 | Chaffanjon | 340/310.06 |
| 5,499,033 | 3/1996 | Smith | 343/700 |
| 5,510,802 | 4/1996 | Tsuru et al. | 343/700 |
| 5,526,003 | 6/1996 | Ogawa et al. | 343/700 |
| 5,581,229 | 12/1996 | Hunt | 340/310.02 |
| 5,603,080 | 2/1997 | Kallander et al. | 455/14 |
| 5,608,391 | 3/1997 | Bantli et al. | 340/933 |
| 5,621,571 | 4/1997 | Bantli et al. | 359/529 |
| 5,630,204 | 5/1997 | Hylton et al. | 455/3.3 |
| 5,668,562 | 9/1997 | Cutrer et al. | 343/703 |
| 5,765,099 | 6/1998 | Georges et al. | 455/14 |
| 5,774,789 | 6/1998 | Van der Kaay et al. | 455/3.3 X |

FOREIGN PATENT DOCUMENTS

| | | |
|---|---|---|
| 2313273 | 11/1997 | United Kingdom . |
| WO95/29537 | 11/1995 | WIPO . |

OTHER PUBLICATIONS

"CityRFx Solutions", *ADC Wireless Systems, Distributed Antenna System*, 4, (1996).

*Primary Examiner*—John W. Miller
*Attorney, Agent, or Firm*—Fogg, Slifer & Polgaze, P.A.

[57] ABSTRACT

A system for distributing RF signals to users over power lines in a structure. The system includes a head end unit that receives RF signals in a first frequency range to be distributed to users in the structure. The head end unit is coupled to the power lines of the structure. RF signals are transmitted over the power lines in a second frequency range. The head end unit includes a frequency converter that translates RF signals between the first frequency range and the second frequency range. The system also includes a number of remote units. The remote units are coupled to the power lines and disposed throughout the structure to provide RF coverage within the structure. The remote units include frequency converters that convert signals between the first and second frequency ranges. Further, an antenna is coupled to each remote unit to transmit signals to and receive signals from the users in the first frequency range.

28 Claims, 4 Drawing Sheets

SYSTEM AND METHOD FOR DISTRIBUTING RF SIGNALS OVER POWER LINES WITHIN A SUBSTANTIALLY CLOSED ENVIRONMENT

TECHNICAL FIELD OF THE INVENTION

The present invention relates generally to the field of communications and, in particular, to a system and method for distributing RF Signals over power lines within a substantially closed environment.

BACKGROUND OF THE INVENTION

In recent years, the telecommunications industry has experienced rapid growth by offering a variety of new and improved services to customers. This growth has been particularly notable in the area of wireless communications, e.g., cellular and mobile radio systems. One of the factors that has led to the rapid growth in the wireless arena is the objective of allowing a user to be reached any time, and anywhere. Unfortunately, the industry has not been able to reach this goal even though large and small companies and various consortiums are frantically building vast networks in an effort to capture a share of this booming market.

Despite their efforts to provide seamless and blanket coverage for wireless telecommunications, some areas remain unaccessible. One particular difficulty is communication within a substantially closed environment, such as a building or other structure which can interfere with radio waves. The structure itself acts as a barrier and significantly attenuates or reduces the signal strength of the radio waves to the point that transmission is not possible at the frequency and power levels used in these systems.

The industry has toyed with a number of options to extend coverage into buildings and other substantially closed environments. For example, one solution to this problem has been to distribute antennas within the building. Typically, these antennas are connected to an RF signal source by dedicated coaxial cable, optical fiber, and, more recently, unshielded twisted pair wires. In such systems, various methods of signal conditioning and processing are used, ranging from straight bi-directional on-frequency amplification and band pass filtering to select which service or service provider to transport, to frequency conversion methods to move the signals to a more desirable segment of the frequency spectrum for transport. Some systems also use passive antenna methods and "leaky" coaxial cable to radiate signals within the desired area without any signal conditioning. Unfortunately, the costs associated with installing such systems are prohibitively out of line with the benefits derived by the in-building coverage area provided by the system.

For the reasons stated above, and for other reasons stated below which will become apparent to those skilled in the art upon reading and understanding the present specification, there is a need in the art for an economically viable system and method for distributing RF signals in a substantially closed environment.

SUMMARY OF THE INVENTION

The above mentioned problems with wireless communications systems and other problems are addressed by the present invention and will be understood by reading and studying the following specification. A system and method for distributing RF signals in a substantially closed environment are described which use the power lines in the closed environment to distribute signals to and from antennas within the closed environment.

In particular, an illustrative embodiment of the present invention includes a system for distributing RF signals to users over power lines in a structure. The system includes a head end unit that receives RF signals in a first frequency range to be distributed to users in the structure. The head end unit is coupled to the power lines of the structure. RF signals are transmitted over the power lines in a second frequency range. The head end unit includes a frequency converter that translates RF signals between the first frequency range and the second frequency range. The system also includes a number of remote units. The remote units are coupled to the power lines and disposed throughout the structure to provide RF coverage within the structure. The remote units include frequency converters that convert signals between the first and second frequency ranges. Further, an antenna is coupled to each remote unit to transmit signals to and receive signals from the users in the first frequency range.

In another embodiment, a head end unit for an RF distribution system that transmits signals over AC power lines is provided. The head end unit includes a block converter that is coupled to receive signals from an RF source in a first frequency range. The block converter converts RF signals between the first frequency range and a second frequency range. The head end unit also includes a control processor that generates a control signal for remote units in the RF distribution system. Further, an ac power line interface is coupled to the block converter and the control processor for providing signals to and receiving signals from the ac power lines in the second frequency range.

In another embodiment, a remote unit for an RF distribution system that transmits signals over AC power lines is provided. The remote unit includes an antenna that communicates with wireless terminals using RF signals in a first frequency range. A block converter is coupled to the antenna and converts RF signals between the first frequency range and a second frequency range. A control processor receives a control signal from a head end unit and controls the operation of the remote unit. The remote unit also includes an ac power line interface coupled to the block converter and the control processor that provides signals to and receives signals from the ac power lines in the second frequency range.

In another embodiment, a method for transmitting RF signals in a substantially closed environment is provided. The method includes block converting RF signals between first and second frequency ranges at a head end unit. Further, the method calls for transmitting the RF signals in the second frequency range within the closed environment over ac power wiring between head end and remote units. The method also calls for block converting the RF signals between the first and second frequency ranges at the remote units. In this embodiment, the first frequency range is used for over-the-air transmission at both the head end and remote units.

DETAILED DESCRIPTION OF THE INVENTION

In the following detailed description, reference is made to the accompanying drawings which form a part hereof, and in which are shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit and scope of the present invention. The following detailed description is, therefore, not to be taken in a limiting sense.

In one embodiment, the present invention provides a radio frequency (RF) distribution system that transports RF signals throughout a building or other substantially closed environment to and from hand-held and desktop RF devices, e.g., cellular telephones, without the use of dedicated wiring or optical fiber. For purposes of this specification, the term "substantially closed environment" or "closed structure" means an area in which the signal strength of a wireless communication system is diminished to a level so as to inhibit or reduce the effectiveness of communication by a wireless terminal with the wireless communication system. For example, a substantially closed environment includes, but is not limited to, a building, a campus of buildings, a mall or other similar type of structure. In this embodiment, the RF signals are impressed upon the existing AC power wiring of the substantially closed environment and extracted from it by using the techniques described below. RF signals that can be transported and distributed via these techniques include, but are not limited to, cellular, personal communication systems, land mobile, data, broadcast video, broadcast audio, paging, two-way and direct broadcast satellite, including low earth orbital satellites, wireless local area network (LAN) and wireless metropolitan area network (MAN) devices and RF telemetry.

The embodiments of the invention provide signal distribution using a unique method that does not require any new physical wiring or plant to be installed that is dedicated to the transport of the RF signals, but rather relies on using the existing AC power wiring, for example, as the physical interconnect medium. No other infrastructure other than head end and remote units is needed for operation. A number of difficulties are present when attempting to use the power lines as transmission lines, however.

In another area, some industries have developed methods for transmitting communication signals over power lines. For example, in the utility industry, many public utilities use "carrier current" methods of communications to, for example, read meters at a customer site from a central location. Typically, such carrier current methods of communication use low frequency (e.g., below 400 kilohertz) RF signals that are modulated with information related to the power companies' control and signaling needs. These modulated signals are transmitted over power lines between the power company and signaling and monitoring equipment located at its customer's location. Conventional practices indicate that only low frequencies are used in these systems because low frequency signals propagate better along the power grid than higher frequencies. Thus, signaling over the power lines has received a very limited use outside the utility industry. Conventionally, AC power lines are understood to be an inherently inefficient transmission medium for radio frequency signals above 400–500 kilohertz.

Further, there are very large spectral noise components from 500 kilohertz up to approximately 50 megahertz that make this portion of the spectrum unusable for transmitting RF signals over power lines. Additionally, the presence of other ingress noise, e.g., shortwave broadcasters, in this portion of the spectrum make this portion of the spectrum virtually unusable as a transport frequency for power lines. It has been discovered, however, that RF frequencies in the range from approximately 100 megahertz to approximately 500 megahertz provide a good compromise between noise and attenuation for transmission on AC power lines. Above 500 megahertz, the RF signals attenuate too rapidly for the power lines to provide an acceptable transmission medium. Further, below 50 megahertz, too much noise on the power lines makes transmission unacceptable. However, in the range from 100 to 500 megahertz, RF power lines have been discovered to provide reasonable transport distances with reasonably low noise levels so as to allow transport over the power lines in this frequency range.

Figure 1:
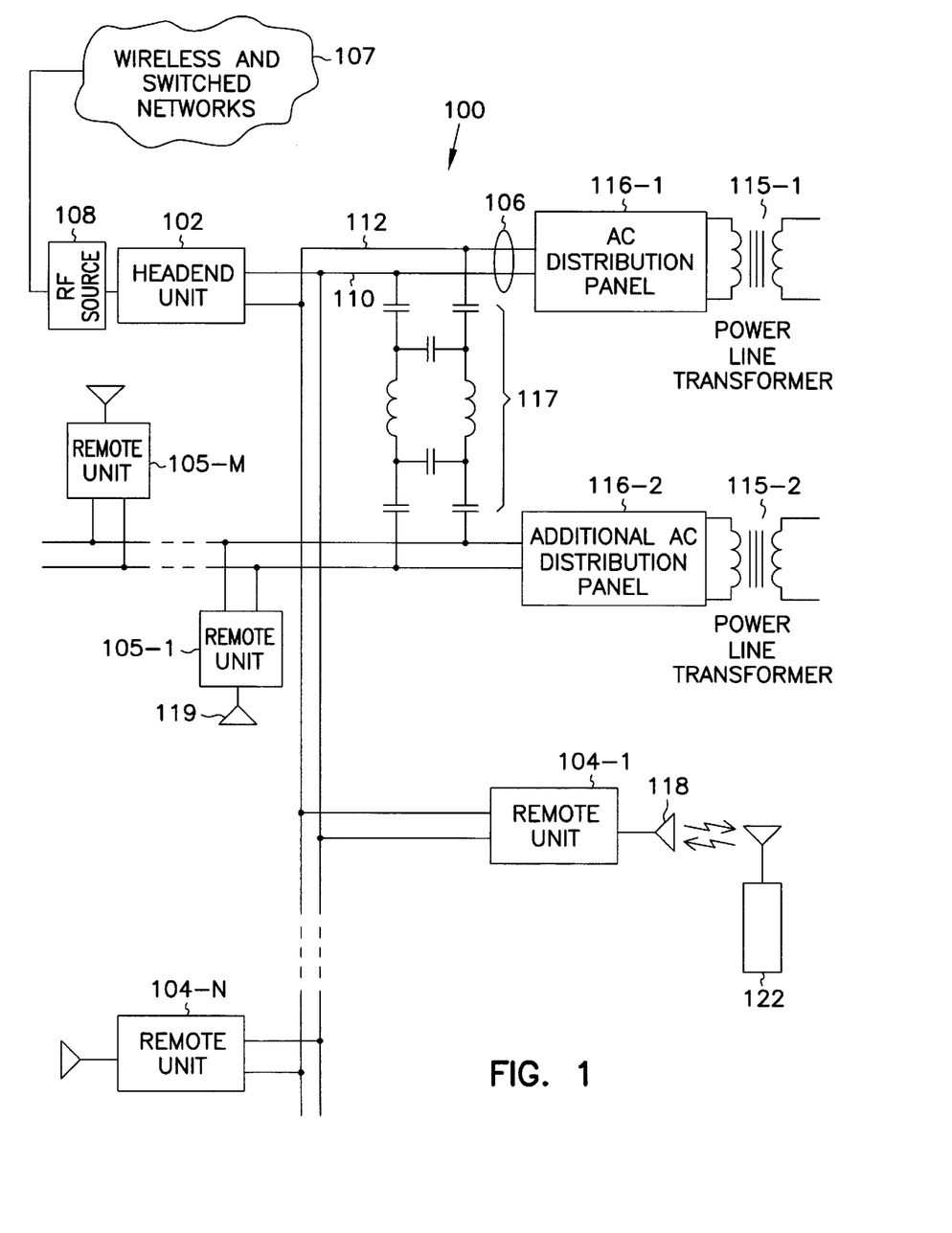
FIG. 1 is a block diagram of an embodiment of an RF distribution system constructed according to the teachings of the present invention.

FIG. 1 is a block diagram of an embodiment of an RF distribution system, indicated generally at 100, and constructed according to the teachings of the present invention. System 100 includes head end unit 102 that communicates with a number of remote units 104-1 through 104-N, and 105-1 through 105-M over power lines 106 in a closed structure, e.g., within a building, collection of buildings, or other substantially closed environment.

Head end unit 102 is coupled to RF source 108. RF source 108 may comprise, for example, a conventional antenna, an RF transport unit that uses either fiber-optics or copper cable to carry signals to and from a base station, or a co-located base station unit of a wireless communication system. RF source 108 is coupled to wireless and switched network 107 by either a wired or wireless communication path. Head end unit 102 is also connected to power lines 106, including circuit ground 110 and circuit hot 112. In one embodiment, head end unit 102 includes a circuit that derives DC power for head end unit 102 from the AC power on power lines 106. Head end unit 102 also includes an AC power line interface circuit that is coupled to one of power lines 106 to allow RF signals to be passed between one of the power lines and head end unit 102. For example, the AC power line interface may be coupled to the circuit ground 110.

Power lines 106 are coupled to AC distribution panel 116-1 which receives power from transformer 115-1 as is conventional in wiring systems for a closed structure. Advantageously, power lines 106 may comprise, for example, a dedicated or closed wiring system. Such closed wiring systems include but are not limited to emergency lighting systems, exit sign system or other circuits that are dedicated to provide power to a specified and limited number of devices. These closed wiring systems provide the advantage of not being as susceptible to RF shorts when additional devices are plugged into the wiring system. Alternatively, lighting circuits in a building provide a relatively constant transmission system for communication between head end unit 102 and remote units 104-1 through 104-N, and 105-1 through 105-M.

In one embodiment, system 100 may be installed in a closed structure with power lines 106 that are divided into a number of isolated AC power circuits as shown in FIG. 1. System 100 uses the power lines associated with ac distribution panel 116-1 and additional AC distribution panel 116-2 to distribute signals within the closed structure. When multiple AC power circuits are used in system 100, RF "jumpers" such as AC blocking/RF coupling circuit 117 are used to carry RF signals from one power circuit to another power circuit. AC blocking/RF coupling circuit 117 is tuned to a second frequency to facilitate RF coupling between the isolated AC power circuits.

Remote unit 104-1 is coupled to power lines 106. Namely, remote unit 104-1 includes a first terminal that is coupled to circuit hot line 112 and a second terminal that is coupled to circuit ground line 110. Remote unit 104-1 also is coupled to antenna 118 for distributing RF signals to and from wireless terminals 122 within the closed structure. Capacitor 120 is also coupled between remote unit 104-1 and circuit ground 110. The remaining remote units are similarly coupled to power lines 106.

In operation, system 100 distributes RF signals to wireless terminals 122 using power lines 106 to route the signals to and from an antenna within the vicinity of wireless terminal 122. In the forward direction (to wireless terminal 122), RF source 108 receives signals for, e.g., wireless terminal 122 at an over-the-air frequency specified from wireless and switched networks 107. Head end unit 102 converts the over-the-air frequency from RF source 108 to an appropriate intermediate transport frequency for transmission over power lines 106. For example, it has been determined that the frequency range from approximately 100 megahertz to 500 megahertz provides reasonable transport distances with acceptable noise levels for power lines 106. Remote units 104-1 through 104-N, and 105-1 through 105-M convert the frequency range of the signals from power lines 106 to the over-the-air frequency range of the signals received from RF source 108. In this example, antenna 118 transmits the signals within the confines of the closed structure for receipt by wireless terminal 122.

In the reverse direction (from wireless terminal 122), wireless terminal 122 transmits signals to, e.g., remote unit 104-1. Remote unit 104-1 converts the over-the-air frequency of these signals to an intermediate transport frequency that is used on power lines 106. Head end unit 102 receives signals from remote units 104-1 through 104-N, and 105-1 through 105-M and converts the frequency range of the signals from power line 106 to the over-the-air frequency range. RF source 108 transmits these signals to wireless and switched networks 107. It is noted that AC blocking/RF coupling circuit 117 couples RF signals between the two AC power circuits to provide for communication between head end 102 and remote units 105-1 through 105-M.

Figure 2:
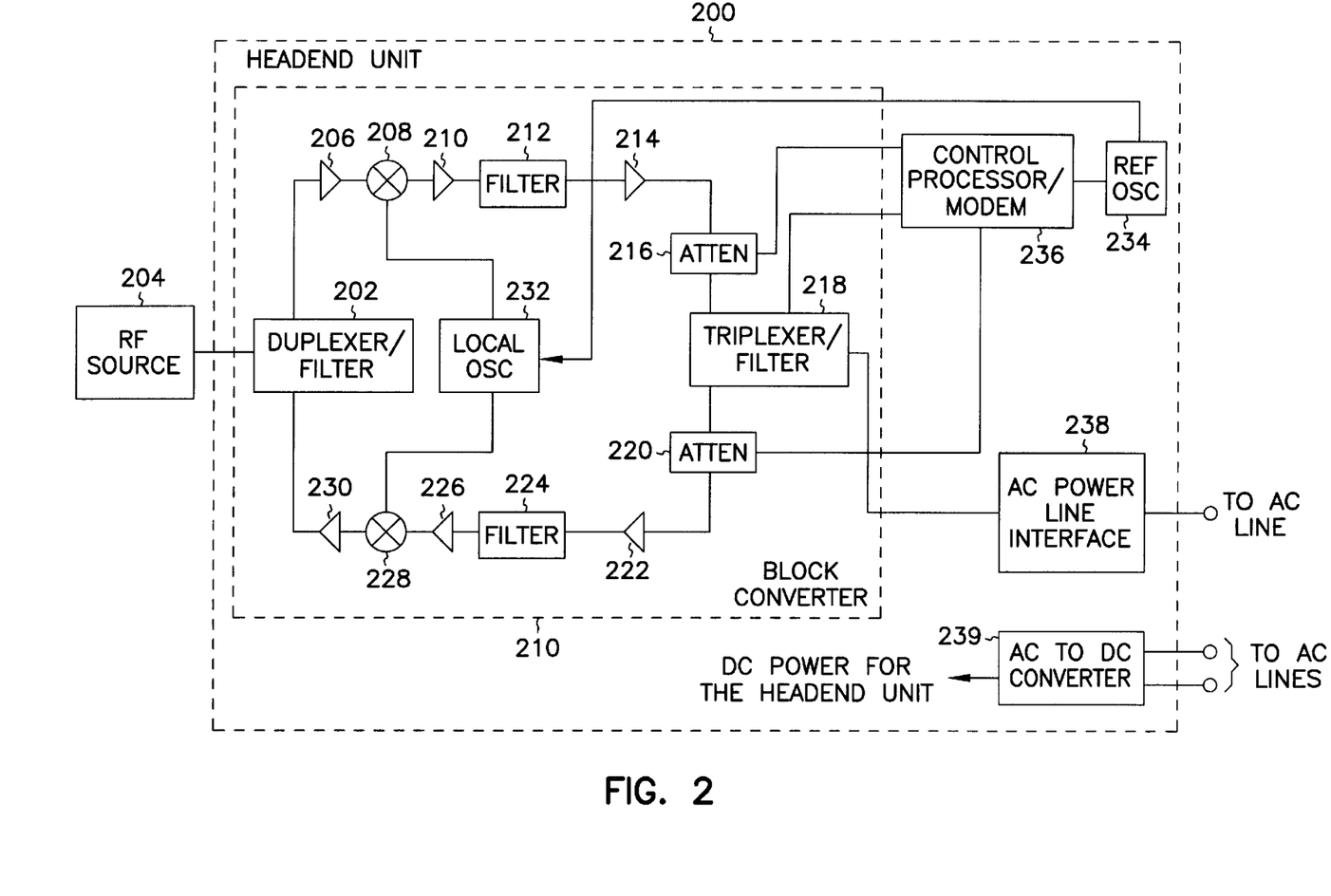
FIG. 2 is a block diagram of an embodiment of an head end unit for an RF distribution system according to the teachings of the present invention.

FIG. 2 is a block diagram of an embodiment of a head end unit, indicated generally at 200, for use in an RF distribution system according to the teachings of the present invention. Head end unit 200 is disposed in a convenient location in a substantially closed environment that is accessible to RF signal source 204 and has access to the AC power system in the building. Head end unit 200 includes block converter 201 that converts RF signals between first and second frequency ranges. Block converter 201 includes duplexer/filter 202 that is coupled to RF source 204. Similarly, as with FIG. 1, RF source 204 may comprise, for example, a conventional antenna, an RF transport unit that uses either fiber-optics or copper from a base station, or a co-located base station unit. Duplexer/filter 202 is coupled to both a forward and a reverse path. In the forward path, block converter 201 includes the serial connection of amplifier 206, mixer 208, amplifier 210, band pass filter 212, amplifier 214 and attenuator 216. Attenuator 216 in the forward path is coupled to triplexer/filter 218. In the reverse path, attenuator 220, amplifier 222, filter 224, amplifier 226, mixer 228 and amplifier 230 are coupled in series between triplexer/filter 218 and duplexer/filter 202.

Block converter 201 includes local oscillator 232. Local oscillator 232 is coupled to mixers 208 and 228. Additionally, local oscillator 232 receives a reference signal from reference oscillator 234.

Head end unit 200 also includes control processor/modem 236. Control processor/modem 236 receives the reference signal from reference oscillator 234. Control processor/modem 236 is also coupled to control attenuators 216 and 220 so as to establish an appropriate gain for the forward and reverse paths. Typically, this gain should be on the order of 20 to 40 dB. The amount of attenuation in attenuators 216 and 220 is established and stored in control processor/modem 236 when head end unit 200 is installed in a system. Control processor/modem 236 is also coupled to triplexer/filter 218 so as to provide a separate control signal to communicate with and control remote units in a system. The control signal is generated by head end unit 200 and exists outside any of the frequencies used for the transport of signals from RF source 204. This control signal contains set-up and alarm information for use by the remote units and initial and continuing calibration and event reporting that is used by the remote units. Control processor/modem 236 impresses the required information upon a control carrier and extracts responses from the remote units. The remote units, e.g., of the type shown and described with respect to FIG. 3, also contain a microprocessor and modem to communicate with the head end unit via the control signal, and act upon the information and report abnormal events back to the head end unit (alarms). The alarm and control information is available at head end unit 200 to be relayed back to the network operation center for a wireless system via a wireless modem or a modem on a wired telephone system.

Head end unit 200 also includes AC power line interface 238 that is coupled to an output of triplexer/filter 218. AC power line interface 238 provide for matching/isolating head end unit 200 to couple the RF energy into and extract RF energy from the AC power system. Head end unit 200 also includes AC to DC converter 238 that generates a DC power signal from the power on the AC line to provide power for head end unit 200. Other appropriate power sources can be used in place of the AC to DC converter.

In operation, head end unit 200 operates to convert RF signals between an over-the-air frequency range to a frequency range appropriate for distribution over AC power lines in the power distribution system. RF signals enter head end unit 200 from RF source 204 at duplexer/filter 202. Duplexer/filter 202 filters out signals outside the desired range of RF signals to be processed by head end unit 200. Amplifier 206 is a low-noise amplifier that amplifies the desired signals and passes them along to mixer 208. At mixer 208, the signals are heterodyned together with a signal from local oscillator 232, e.g., approximately 1500 Mhz for PCS, 1200 Mhz for cellular, or approximately 400 Mhz offset from the first frequency in the band, which is phase and frequency locked to reference oscillator 234 to provide end-to-end stability. The resulting signals from mixer 208 are in the intermediate frequency range from 100 to 500 megahertz. The signals are amplified and filtered by amplifiers 210 and filter 212, respectively. Amplifier 214 and attenuator 216 further adjust the amplification on the signals and provide the signals to triplexer/filter 218. AC power line interface 238 using, for example, a torodial inductive/capacitive network, provides proper isolation and maximum signal coupling conditions over a wide variety of loading conditions to pass the signals to the AC power system.

Control information is sent from head end unit 200 to the remote units by control processor/modem 236. Communications from control processor/modem 236 is accomplished by low-speed, 9600, frequency shift keyed (FSK) control signal that contains information generated by control processor/modem 236. This control information provides frequency stability information for the local oscillators of the remote units, control information for the on-off amplitude, auto-calibration adjustments required by the remote units, and alarm information for failure reporting.

In the reverse direction, AC power line interface 238 receives signals from the remote units over the AC power lines. Triplexer/filter 218 passes the signals through attenuator 220, amplifier 222, filter 224, amplifier 226 to mixer 228. At mixer 228, a signal from local oscillator 232 returns the signals to the over-the-air frequency range. Amplifier 230 amplifies the signals and provides the signals to duplexer/filter 202. Duplexer/filter 202 provides the signals from amplifier 230 to RF source 204 for transmission to an external wireless or wireless and switched network.

Figure 3:
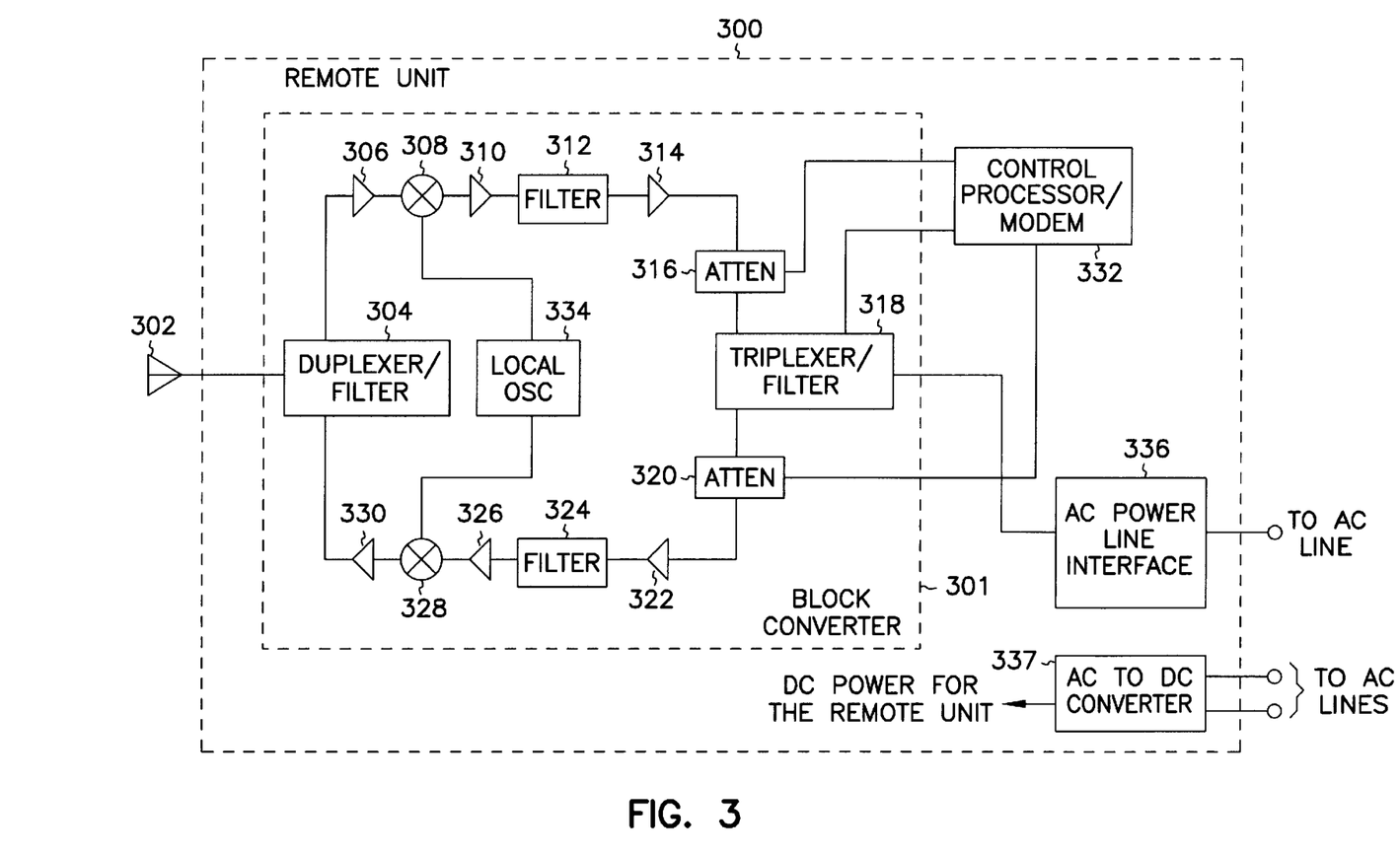
FIG. 3 is a block diagram of an embodiment of a remote unit for an RF distribution system according to the teachings of the present invention.

FIG. 3 is a block diagram of an embodiment of a remote unit, indicated generally at 300, and constructed according to the teachings of the present invention. Remote unit 300 communicates signals to and from a wireless terminal over AC power lines to a head end unit such as head end unit 200 of FIG. 2. Remote unit 300 includes antenna 302 that is used to transmit and receive signals to and from the wireless terminal. Antenna 302 is coupled to block converter 301. Block converter 301 includes duplexer/filter 304. Duplexer/filter 304 separates out signals into reverse and forward paths for remote unit 300. In the reverse path, block converter 301 includes amplifier 306, mixer 308, amplifier 310, filter 312, amplifier 314 and attenuator 316 that are coupled in series between duplexer/filter 304 and triplexer/filter 318. Similarly, in the forward path, block converter 301 includes attenuator 320, amplifier 322, filter 324, amplifier 326, mixer 328 and amplifier 330 coupled in series between triplexer/filter 318 and duplexer/filter 304. Remote unit 300 also includes control processor/modem 332 that is coupled to control attenuators 316 and 320 so as to adjust the gain in the forward and reverse paths when remote unit 300. Additionally, control processor/modem 332 is coupled to provide a control signal to and receive a control signal from triplexer/filter 318 of the type of signal described above with respect to head end unit 200 of FIG. 2. Block converter 301 also includes local oscillator 334 that is coupled to mixers 308 and 328 to provide a reference frequency for use in mixing signals in the reverse and forward paths. Remote unit 300 also includes AC power line interface 336 that couples signals to and from triplexer/filter 318 with the AC power system. Remote unit 300 also includes an AC to DC converter 337 which generates a DC power signal for remote unit 300. Alternatively, other appropriate circuits can be used in place of AC to DC converter 337 to provide DC power for remote unit 300.

In operation, remote unit 300 translates signals between over-the-air frequencies and an intermediate frequency range used for transmission over the AC power lines. In the reverse direction, antenna 302 receives a signal from a wireless terminal in an over-the-air frequency range. This signal is passed to amplifier 306 by duplexer/filter 304. Mixer 308 converts, via heterodyne conversion, the frequency of the signals from amplifier 306 down to an intermediate frequency range for transmission over the AC power lines using the frequency of local oscillator 334. The translated signals are amplified in amplifier 310 and then filtered by band pass filter 312. Amplifier 314 and attenuator 316 are set so as to provide an appropriate overall gain for the reverse path. Triplexer/filter 318 passes the amplified and filtered signal from the reverse path to AC power line interface 336. AC power line interface 336 passes the signal to the AC power lines for transmission to a head end unit.

In the forward direction, AC power line interface 336 receives signals from the AC power lines and transmits these signals to triplexer/filter 318. Attenuator 320 and amplifier 322 are set so as to provide an appropriate gain, e.g. 40 dB, for the forward path. The output of amplifier 322 is filtered in band pass filter 324 and again amplified in amplifier 326. The forward signal is mixed by mixer 328 using the frequency of local oscillator 334 so as to translate the frequency of the forward signal to the range for over-the-air communication. The signal from mixer 328 is amplified in amplifier 330 and provided to antenna 302 by duplexer/filter 304.

Antenna 302 may be integral with a body of remote unit 300. Antenna 302 alternatively could be a separate unit apart from remote unit 300 to facilitate placement of antenna 302. In one embodiment, antenna 302 of remote unit 300 is mounted within or on an exit sign in a building. Such exit signs are required in commercial buildings so that they are commonly visible to all the occupants of the facility and therefore provide a good antenna location.

In another embodiment, head end 102 of FIG. 1 does not convert the frequency of the RF signals received from antenna 108. Rather, head end 102 leaves the RF signals at the over-the-air frequencies. In this manner, power lines 106 act as the antenna itself for broadcasting the RF signals within the building. This would eliminate the need for remote units 104 in certain situations, such as wood construction in private residences that use electrical wiring not installed in metallic conduits. This embodiment would result in a very cost-effective residential unit that could be easily deployed as an in-house booster, either as a one-way amplifier or using a bi-directional amplifier. Additionally, a carrier sense switching circuit could be attached to the return-path amplifier to have this amplifier turn on only when subscriber units are transmitting. This would prevent the low-level noise always generated by the return-path amplifier from occupying the channel and reducing the carrier-to-noise ratio of low-level desired signals that are on the frequency.

In another embodiment, the system of FIG. 1 uses a dedicated feed from a base station. In this embodiment, an additional set of reverse path signals are used to simulate a diversity receive path. The additional set of reverse-path signals are heterodyned to another frequency in order to transport a diversity receive path back to the head end and present the signal set with its phase and amplitude components to the base station as the diversity receive path.

Figure 4:
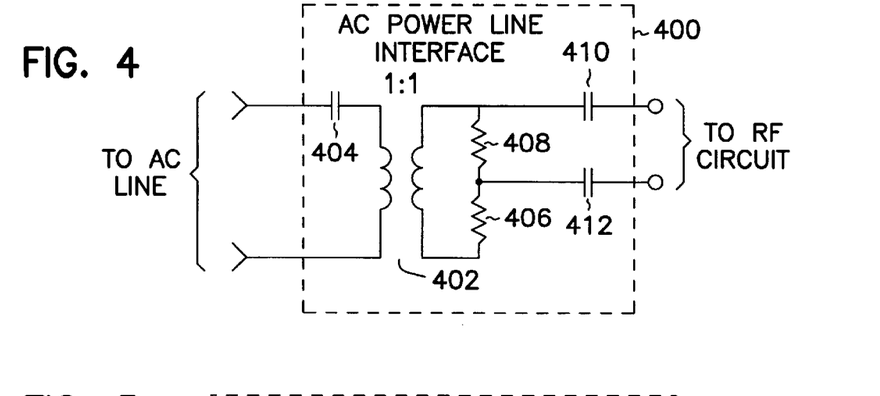
FIG. 4 is a schematic diagram of an embodiment of an AC power line interface for use in an RF distribution system according to the teachings of the present invention.
Figure 5:
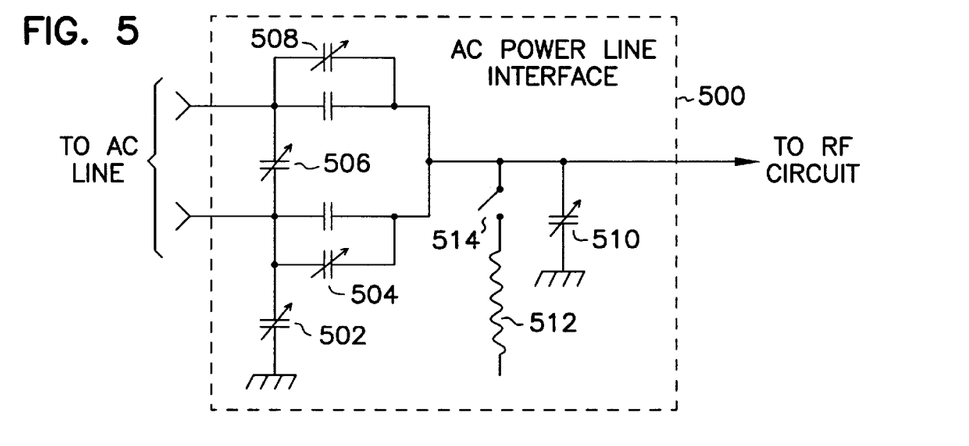
FIG. 5 is a schematic diagram of another embodiment of an AC power line interface for use in an RF distribution system according to the teachings of the present invention.
Figure 6:
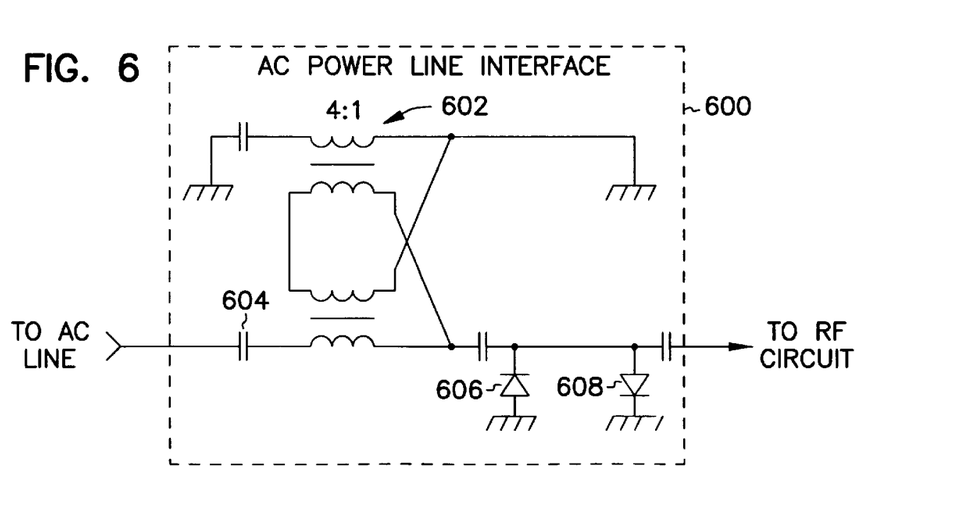
FIG. 6 is a schematic diagram of another embodiment of an AC power line interface for use in an RF distribution system according to the teachings of the present invention.

FIGS. 4, 5 and 6 illustrate various embodiments of AC power line interface circuits that can be used in, for example, head end unit 200 of FIG. 2 or remote unit 300 of FIG. 3. The various AC power line interface circuits are used to match head end unit 200 or remote unit 300 with the load of the AC power system. Additionally, an AC power line interface circuit also provides the function of isolating head end unit 200 or remote unit 300 from signal spikes on the AC power line.

In the embodiment shown in FIG. 4, AC power line interface 400 includes a one-to-one transformer 402. A first input of transformer 402 is coupled to the AC power line. Additionally, a second input of transformer 402 is coupled through blocking capacitor 404 to the AC power line. Resistors 406 and 408 in this embodiment are provided primarily to aid in peak load protection for the head end unit 200 or remote unit 300. Additional blocking capacitors 410 and 412 are included in AC power line interface 400.

In an alternative embodiment shown in FIG. 5, AC power line interface 500 includes a number of variable capacitors. Variable capacitors 502, 504, 506 and 508 comprise, for example, discrete capacitors that are switched in and out with a rotary switch. AC power line interface 500 also includes a fine-tuning capacitor 510 that is continuously variable. Finally, AC power line interface 500 also includes shunt inductance 512 that is switched in and out of AC power line interface 500 by switch 514. Shunt inductance 512, variable capacitors 502, 504, 506 and 508 and fine-tuning capacitor 510 are used to tune AC power line interface 500 to match the RF power line. The variable capacitors and shunt inductance are included to allow AC power line interface 500 to be adjusted on a case-by-case basis to improve signal transfer between the power lines and the head end or remote unit.

In another embodiment, AC power line interface 600 includes four-to-one transformer 602 that is coupled between the AC power line and either head end unit 200 or remote unit 300. AC power line interface circuit 600 also includes blocking capacitor 604 and protection diodes 606 and 608.

CONCLUSION

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, other matching/interface networks could be used in place of the embodiments shown in FIGS. 4, 5, and 6. Further, the number of amplifiers and placement of the amplifiers in the forward and reverse paths of the head end and remote units can be varies without departing from the spirit and scope of the present invention. Further, system 100 of FIG. 1 can be used with an AC distribution system in a closed structure with a single AC distribution panel without the need for coupling circuit 117. System 100 can also be used in a closed structure with more than two AC distribution panels by using additional coupling circuits 117 to couple signals from one circuit to another. Thus, the system with two AC distribution panels shown in FIG. 1 is shown by way of example, and not by way of limitation.

What is claimed is:

1. A system for distributing RF signals to users over power lines in a structure, the system comprising:
   a head end unit that receives RF signals in a first frequency range to be distributed to users in the structure;
   the head end unit coupled to the power lines of the structure wherein RF signals are transmitted over the power lines in a second frequency range;
   the head end unit including a frequency converter that translates RF signals between the first frequency range and the second frequency range;
   wherein the frequency converter comprises a circuit that converts the first frequency range to a range between 100 and 500 MHZ;
   a number of remote units, coupled to the power lines and disposed throughout the structure to provide RF coverage within the structure, the remote units including frequency converters that convert signals between the first and second frequency ranges; and
   an antenna coupled to each remote unit to transmit signals to and receive signals from the users in the first frequency range.

2. The system of claim 1, and further including a base station coupled to the head end unit to provide the forward RF signals and to receive the reverse RF signals.

3. The system of claim 1, and further including an antenna coupled to the head end unit to provide the forward RF signals to the head end unit and to receive the reverse RF signals from the head end unit.

4. The system of claim 1, wherein the frequency converter includes a pair of mixers that are controlled by a common local oscillator.

5. The system of claim 1, wherein the head end unit and the remote units include variable amplifiers in a reverse path and a forward path.

6. The system of claim 1, wherein the antenna associated with a remote unit is disposed separate from the remote unit.

7. The system of claim 1, wherein the head end unit and the remote units are coupled to a controlled access AC power distribution system within the structure.

8. The system of claim 1, wherein the head end unit includes an AC power line interface that matches the head end unit with the load of the AC power lines.

9. The system of claim 1, wherein the head-end unit includes:
   a control processor that generates a frequency locking signal for the remote units; and
   a modem coupled to the control processor that modulates a carrier with the locking signal so as to provide the signal to the remote units.

10. The system of claim 9, wherein each remote unit includes a modem for communicating with the control processor of the head end unit.

11. A system for distributing RF signals in a structure, the system comprising:
    a head end unit that receives RF signals in a first frequency range to be distributed over AC power lines to a number of remote units disposed throughout the structure to provide RF coverage within the structure for RF transmission to users;
    the head end unit including:
       a frequency converter that translates RF signals between the first frequency range and a second frequency range,
       a power line interface circuit that couples the head end unit to the AC power lines of the structure and that matches the head end unit with the load of the AC power lines,
       a control processor that generates a frequency locking signal for the remote units,
       a modem coupled to the control processor that modulates a carrier with the frequency locking signal so as to provide the frequency locking signal to the remote units, and
    each remote unit including:
       a power line interface circuit that couples the remote unit to the AC power lines of the structure and that matches the remote unit with the load of the AC power lines,
       a frequency converter that translates RF signals between the first and second frequency ranges, and an antenna coupled to the remote unit to transmit signals to and receive signals from the users in the first frequency range.

12. The system of claim 11, and further including a base station coupled to the head end unit to provide the forward RF signals and to receive the reverse RF signals.

13. The system of claim 11, and further including an antenna coupled to the head end unit to provide the forward RF signals to the head end unit and to receive the reverse RF signals from the head end unit.

14. The system of claim 11, wherein the frequency converter includes a pair of mixers that are controlled by a common local oscillator.

15. The system of claim 11, wherein the frequency converter comprises a circuit that converts the first frequency range to a range between 100 and 500 MHZ.

16. The system of claim 11, wherein the head end unit and the remote units include variable amplifiers in a reverse path and a forward path.

17. The system of claim 11, wherein the antenna associated with a remote unit is disposed separate from the remote unit.

18. The system of claim 11, wherein each remote unit includes a modem for communicating with the control processor of the head end unit.

19. The system of claim 11, wherein the head end unit and the remote units are coupled to a controlled access AC power distribution system within the structure.

20. A head end unit for an RF distribution system that transmits signals over AC power lines, the head end unit comprising:
- a block converter that is coupled to receive signals from an RF source in a first frequency range, wherein the block converter converts RF signals between first and second frequency ranges; and wherein the block converter includes:
  - a mixer, an amplifier and a filter coupled in series between the RF source and the AC power line interface in a forward path;
  - a filter, an amplifier and a mixer coupled in series between the AC power line interface and the RF source in a reverse path;
  - a local oscillator coupled to the mixers; and
  - a reference oscillator coupled to provide a reference signal to the local oscillator and the control processor;
- a control processor that generates a control signal for remote units in the RF distribution system; and
- an AC power line interface coupled to the block converter and the control processor that provides signals to and receives signals from the AC power lines in the second frequency range.

21. The head end unit of claim 20, wherein the AC power line interface includes a transformer coupled between the power lines and the block converter.

22. A head end unit for an RF distribution system that transmits signals over AC power lines, the head end unit comprising:
- a block converter that is coupled to receive signals from an RF source in a first frequency range, wherein the block converter converts RF signals between first and second frequency ranges;
- a control processor that generates a control signal for remote units in the RF distribution system; and
- an AC power line interface coupled to the block converter and the control processor that provides signals to and receives signals from the AC power lines in the second frequency range, wherein the AC power line interface includes a number of tunable capacitors coupled between the power lines and the block converter.

23. A head end unit for an RF distribution system that transmits signals over AC power lines, the head end unit comprising:
- a block converter that is coupled to receive signals from an RF source in a first frequency range, wherein the block converter converts RF signals between first and second frequency ranges;
- a control processor that generates a control signal for remote units in the RF distribution system; and
- an AC power line interface coupled to the block converter and the control processor that provides signals to and receives signals from the AC power lines in the second frequency range, wherein the control processor is further coupled to the forward and reverse paths so as to establish the gain of the forward and reverse paths.

24. A remote unit for an RF distribution system that transmits signals over AC power lines, the remote unit comprising:
- an antenna that communicates with wireless terminals using RF signals in a first frequency range;
- a block converter coupled to the antenna that converts RF signals between the first frequency range and a second frequency range; and wherein the block converter includes:
  - a mixer, an amplifier and a filter coupled in series between the antenna and the AC power line interface in a reverse path;
  - a filter, an amplifier and a mixer coupled in series between the AC power line interface and the antenna in a forward path;
  - a local oscillator coupled to the mixers; and
  - a reference oscillator coupled to provide a reference signal to the local oscillator and the control processor
- a control processor that receives a control signal from a head end unit and controls the operation of the remote unit; and
- an AC power line interface coupled to the block converter and the control processor for providing signals to and receiving signals from the AC power lines in the second frequency range.

25. The remote unit of claim 24, wherein the AC power line interface includes a transformer coupled between the power lines and the block converter.

26. The method of claim 24, and further comprising locking the frequency of a block converter at the remote units with a reference oscillator at the head end.

27. A remote unit for an RF distribution system that transmits signals over AC power lines, the remote unit comprising:
- an antenna that communicates with wireless terminals using RF signals in a first frequency range;
- a block converter coupled to the antenna that converts RF signals between the first frequency range and a second frequency range;
- a control processor that receives a control signal from a head end unit and controls the operation of the remote unit; and
- an AC power line interface coupled to the block converter and the control processor for providing signals to and receiving signals from the AC power lines in the second frequency range, wherein the AC power line interface includes a number of tunable capacitors coupled between the power lines and the block converter.

28. A remote unit for an RF distribution system that transmits signals over AC power lines, the remote unit comprising:

an antenna that communicates with wireless terminals using RF signals in a first frequency range;

a block converter coupled to the antenna that converts RF signals between the first frequency range and a second frequency range;

a control processor that receives a control signal from a head end unit and controls the operation of the remote unit, wherein the control processor is further coupled to a forward path and a reverse path so as to establish the gain of the forward and reverse paths; and an AC power line interface coupled to the block converter and the control processor for providing signals to and receiving signals from the AC power lines in the second frequency range.

* * * * *